United States Patent [19]
Laney

[11] Patent Number: 5,918,408
[45] Date of Patent: Jul. 6, 1999

[54] DIVING FISHING WEIGHT

[76] Inventor: Scot H. Laney, 3545 NW. 123rd Pl., Portland, Oreg. 97229

[21] Appl. No.: 08/802,248

[22] Filed: Feb. 19, 1997

Related U.S. Application Data

[63] Continuation-in-part of application No. 08/489,122, Jun. 9, 1995, Pat. No. 5,824,728.

[51] Int. Cl.$^6$ .................................................. A01K 95/00
[52] U.S. Cl. ........................................... 43/43.13; 43/44.9
[58] Field of Search ............................... 43/42.36, 42.39, 43/43.13, 44.9

[56] References Cited

U.S. PATENT DOCUMENTS

| | | | |
|---|---|---|---|
| D. 153,798 | 5/1949 | Hinkson . | |
| D. 174,492 | 4/1955 | Daves | 43/43.13 |
| D. 217,644 | 5/1970 | Smith | D21/810 |
| D. 234,763 | 4/1975 | Weathered | D22/126 |
| D. 243,954 | 4/1977 | Raquel | D22/145 |
| D. 327,939 | 7/1992 | Stecher . | |
| D. 375,539 | 11/1996 | Chu . | |
| D. 388,496 | 12/1997 | Reiger . | |
| 1,333,318 | 3/1920 | Kijima | 43/42.36 |
| 1,644,151 | 10/1927 | Rodgers . | |
| 1,801,940 | 4/1931 | Stanley . | |
| 1,963,380 | 6/1934 | Peters et al. . | |
| 2,152,948 | 4/1939 | Bocchino | 43/42.36 |
| 2,184,792 | 12/1939 | Clarke | 43/42.02 |
| 2,241,767 | 5/1941 | Cullerton . | |
| 2,283,779 | 5/1942 | Winter | 43/18.1 |
| 2,295,765 | 9/1942 | Weber . | |
| 2,516,039 | 7/1950 | Wysack | 43/42.36 |
| 2,566,029 | 8/1951 | Louthan | 43/43.13 |
| 2,567,180 | 9/1951 | Bunkowski . | |
| 2,605,577 | 8/1952 | Waugler | 43/43.13 |
| 2,749,651 | 6/1956 | Snider | 43/43.13 |
| 2,788,605 | 4/1957 | Rediess et al. . | |
| 2,986,838 | 6/1961 | Smyser . | |
| 3,570,167 | 3/1971 | Smith | 43/43.13 |
| 3,831,308 | 8/1974 | Shaw | 43/43.13 |
| 3,940,871 | 3/1976 | Evans | 43/43.13 |
| 4,028,839 | 6/1977 | Stubblefield | 43/43.13 |
| 4,086,719 | 5/1978 | Robbins | 43/44.9 |
| 4,138,792 | 2/1979 | Hill . | |

(List continued on next page.)

FOREIGN PATENT DOCUMENTS 1313296   11/1962   France ................................. 43/43.13

Primary Examiner—Michael J. Carone
Assistant Examiner—Darren Ark
Attorney, Agent, or Firm—Kolisch, Hartwell, Dickinson, McCormack & Heuser

[57] ABSTRACT

A diving fishing weight is for receiving a length of fishing line with a first end connected to a fish catching device and a second end connected to a rod and reel assembly. The fishing weight includes a dive-inducing member constructed to dive through water, and dive-stop structure in communication with the dive-inducing member and the fishing line, and being actuable by a force exerted along the fishing line to stop the fishing weight from diving. The dive-inducing member includes a body that has a front region oriented generally toward the fish catching device, a rear region oriented generally toward the rod and reel assembly, opposed sides and an upper surface. The dive-stop structure includes a passage defined by the body that extends through at least a portion of the body, with the passage having a first end proximate the front region of the body and a second end on the upper surface. The fishing weight further includes a pair of wings connected to the body and extending in generally opposed directions outwardly and upwardly from the rear portion of the body toward the front portion and the upper surface to define a wing plane. The fishing weight has a center of gravity bounded generally by the wing plane, and the center of gravity and wing plane cooperate to predispose the weight to dive at a pre-determined angle. The fishing weight is also formed from a novel polymer-based composite material consisting essentially of a first volume of a curable polymeric component mixed with a second volume of iron ferrite particles, such that the unit has a specific gravity of about 7.5–8.0, with the unit including a central substantially uncured section and an outer substantially cured section.

34 Claims, 4 Drawing Sheets

U.S. PATENT DOCUMENTS

| | | | |
|---|---|---|---|
| 4,141,171 | 2/1979 | Muddiman . | |
| 4,161,078 | 7/1979 | Pagani | 43/43.13 |
| 4,164,826 | 8/1979 | Metzler et al. . | |
| 4,177,597 | 12/1979 | Thomassin . | |
| 4,228,612 | 10/1980 | Ohmura | 43/43.13 |
| 4,237,644 | 12/1980 | Hansen | 43/43.13 |
| 4,253,263 | 3/1981 | Franklin et al. . | |
| 4,486,970 | 12/1984 | Larson | 43/43.13 |
| 4,528,771 | 7/1985 | Rea, Jr. | 43/44.9 |
| 4,532,731 | 8/1985 | Wheeler | 43/43.13 |
| 4,750,291 | 6/1988 | Chilton . | |
| 4,783,928 | 11/1988 | Weaver . | |
| 4,793,089 | 12/1988 | Long et al. . | |
| 4,796,378 | 1/1989 | Krueger et al. . | |
| 4,823,495 | 4/1989 | Camilleri | 43/43.13 |
| 4,827,660 | 5/1989 | Dudeck . | |
| 4,837,966 | 6/1989 | Bethel . | |
| 4,845,883 | 7/1989 | Langer . | |
| 4,862,629 | 9/1989 | Ryan . | |
| 4,891,901 | 1/1990 | Baker, Jr. . | |
| 4,916,854 | 4/1990 | Martin . | |
| 4,932,153 | 6/1990 | Paluzzi . | |
| 4,947,574 | 8/1990 | Tapley . | |
| 4,951,413 | 8/1990 | Blevins et al. | 43/43.13 |
| 4,962,610 | 10/1990 | Bleam et al. . | |
| 4,998,373 | 3/1991 | Braswell . | |
| 5,007,195 | 4/1991 | Patterson . | |
| 5,018,297 | 5/1991 | Kennedy, Jr. . | |
| 5,090,151 | 2/1992 | Salminen . | |
| 5,094,026 | 3/1992 | Correll et al. . | |
| 5,117,573 | 6/1992 | Semler . | |
| 5,117,574 | 6/1992 | Perry . | |
| 5,133,146 | 7/1992 | Stecher . | |
| 5,136,801 | 8/1992 | Pond . | |
| 5,165,196 | 11/1992 | Spickelmire | 43/43.13 |
| 5,182,876 | 2/1993 | Lewis . | |
| 5,185,951 | 2/1993 | Hemmerle | 43/43.13 |
| 5,199,209 | 4/1993 | Cook . | |
| 5,216,830 | 6/1993 | Brott, II . | |
| 5,251,395 | 10/1993 | Wicklund . | |
| 5,271,177 | 12/1993 | Cook . | |
| 5,305,543 | 4/1994 | Fore . | |
| 5,309,666 | 5/1994 | Prince | 43/43.13 |
| 5,353,540 | 10/1994 | Ward . | |
| 5,428,917 | 7/1995 | Cunningham . | |
| 5,465,523 | 11/1995 | Garst . | |
| 5,490,347 | 2/1996 | Conley . | |
| 5,497,581 | 3/1996 | Williams . | |
| 5,605,004 | 2/1997 | Boullt et al. . | |
| 5,625,975 | 5/1997 | Imes . | |
| 5,648,121 | 7/1997 | Cornell, Jr. et al. | 43/42.39 |
| 5,732,502 | 3/1998 | Hansen | 43/42.39 |
| 5,824,728 | 10/1998 | Laney | 524/435 |

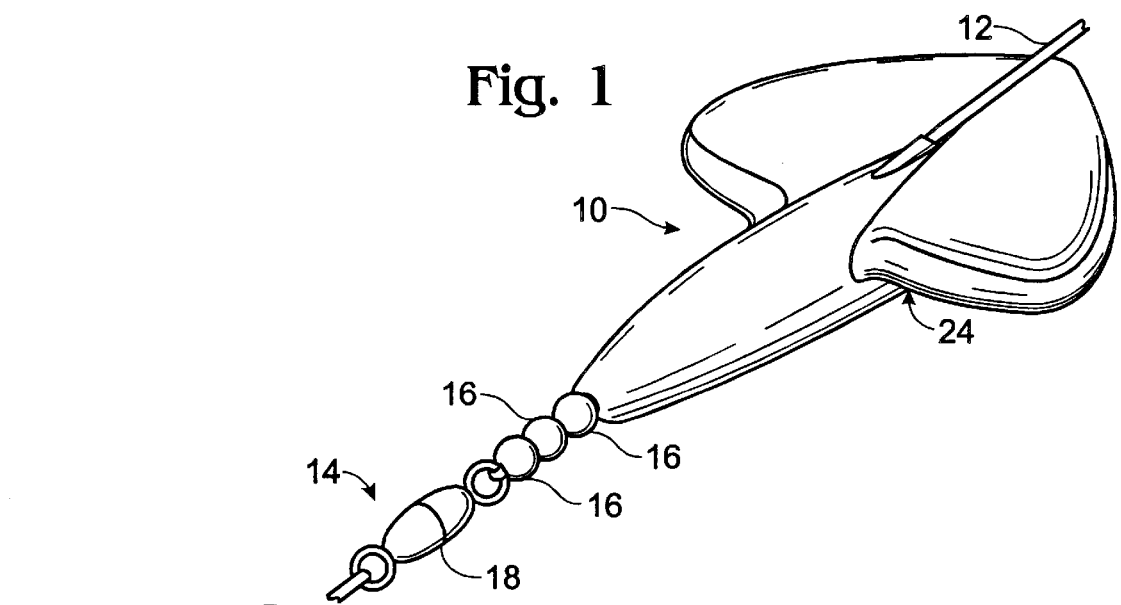
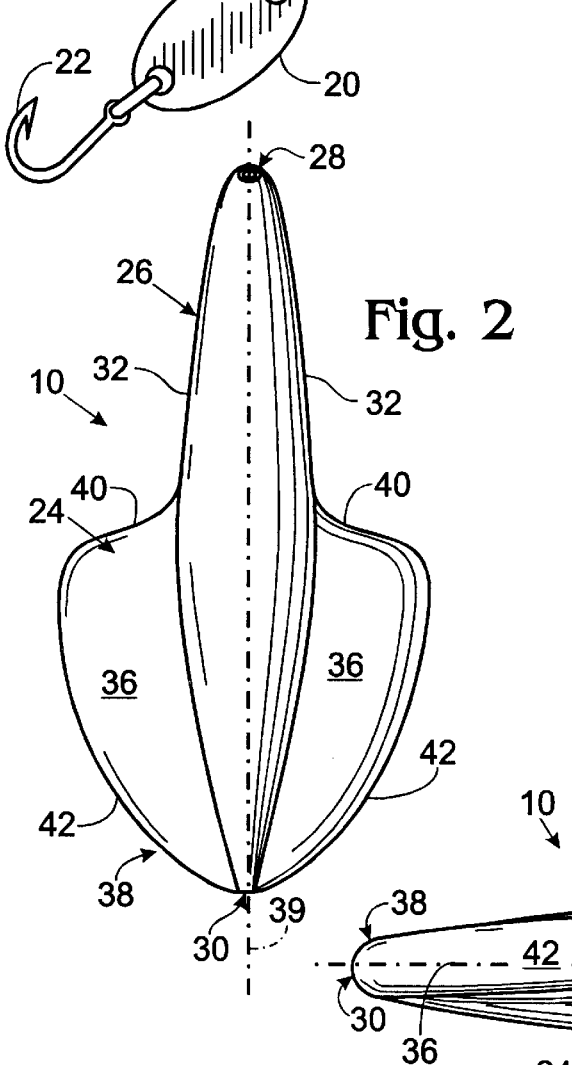
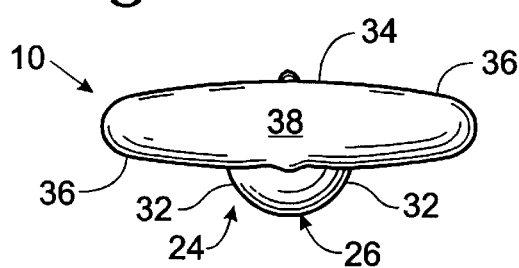
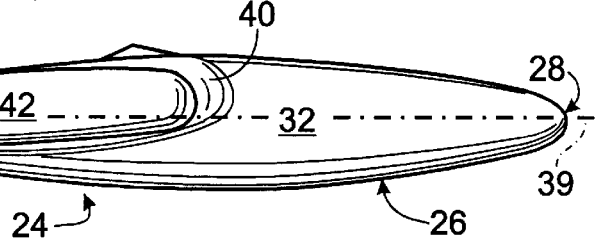

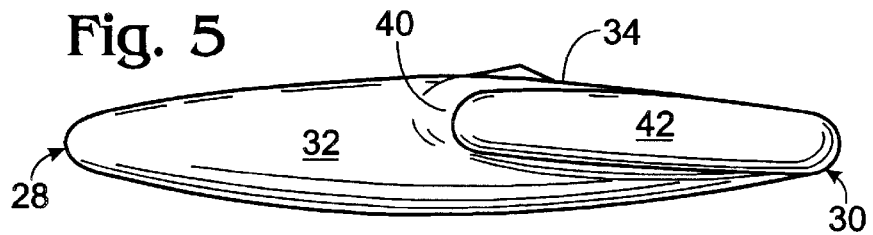
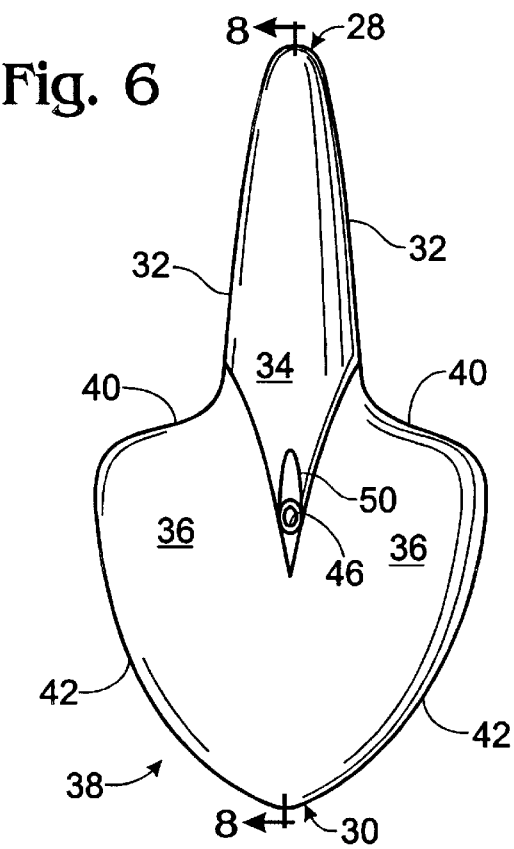
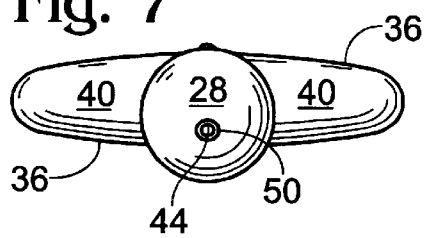
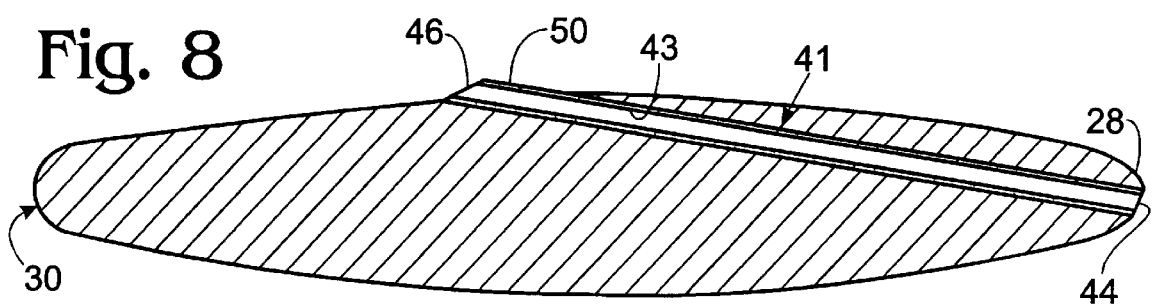

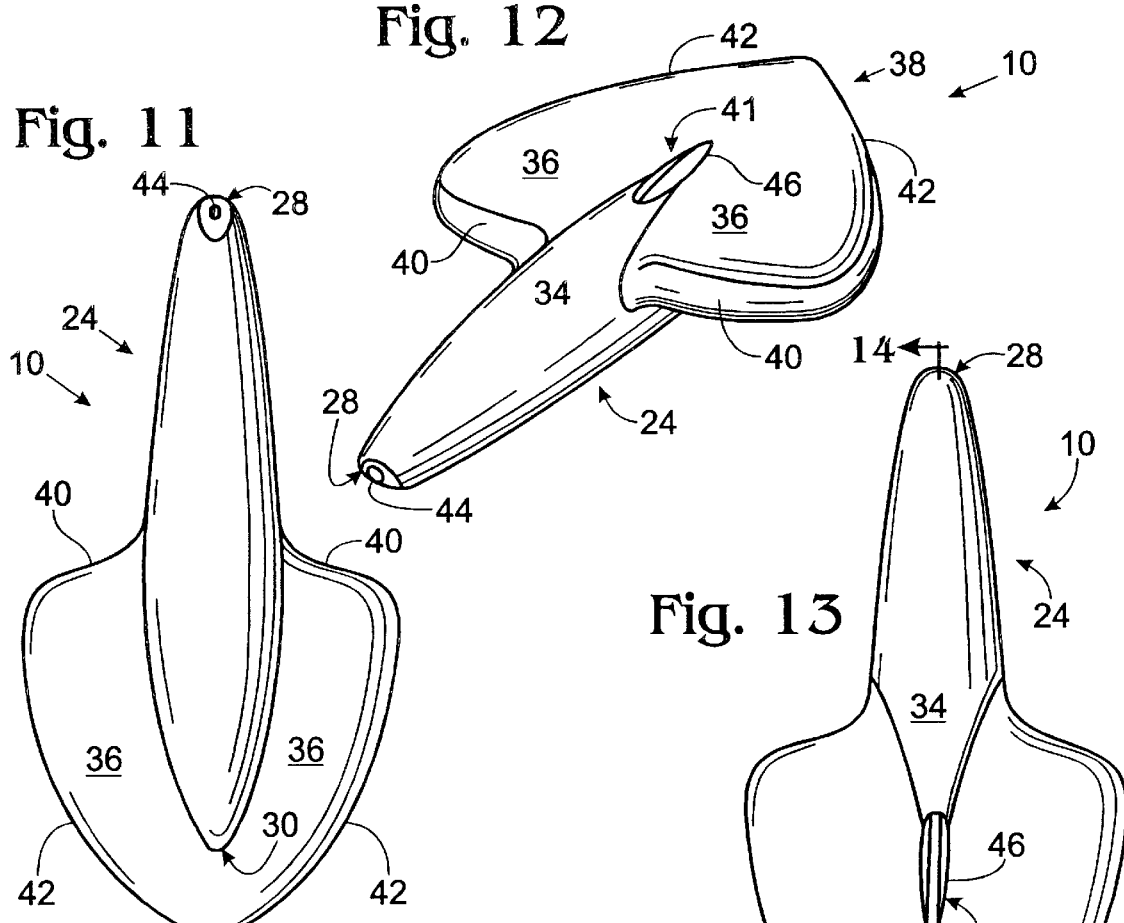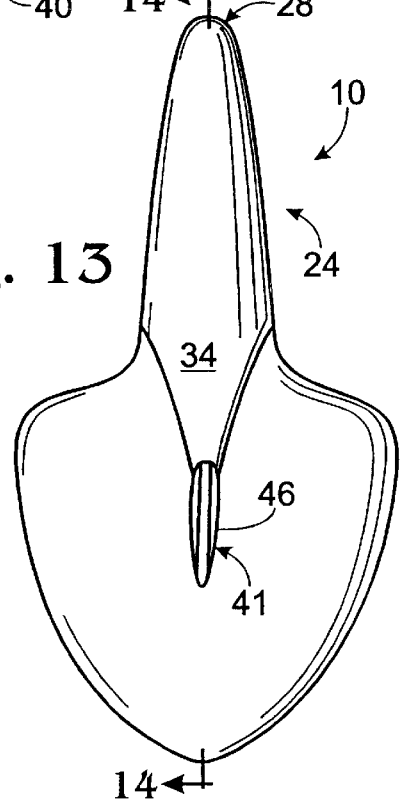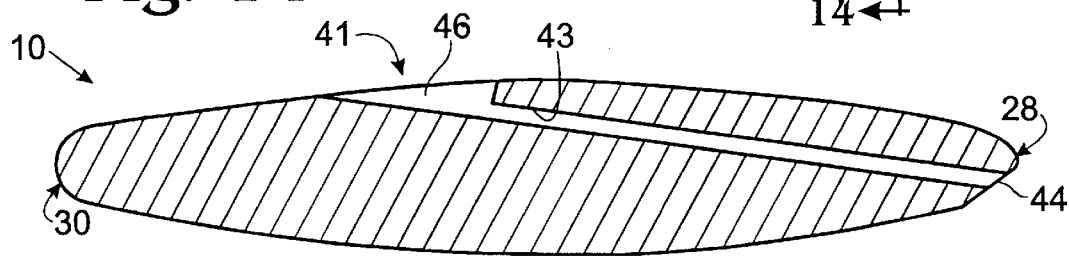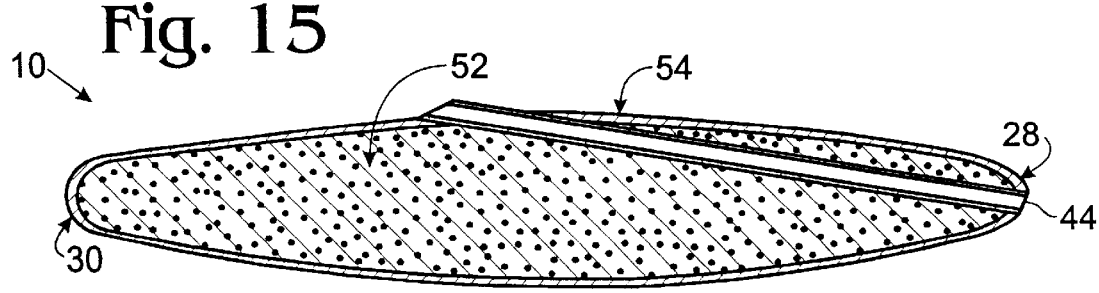

DIVING FISHING WEIGHT

RELATED APPLICATION

This application is a continuation-in-part of Ser. No. 08/489,122, now U.S. Pat. No. 5,824,728, which was filed on Jun. 9, 1995 and is entitled IRON-FERRITE-FILLED POLYMER-BASED COMPOSITE MATERIAL AND METHOD OF MAKING THE SAME.

BACKGROUND AND SUMMARY OF THE INVENTION

The present invention relates generally to fishing weights. More particularly, the invention concerns a novel diving fishing weight that includes an elongate body constructed to dive through water and dive-stop structure that is actuable by a force exerted along a fishing line to stop the fishing weight from diving.

Previously, fishermen have used certain sinking fishing weights that are capable of sinking in heavy current to fish in deep rivers, lakes and the ocean. Essentially, sinking fishing weights have been used to ensure that the lure on the end of the fishing line goes down in the water where the fish are located. Heavy current in deep waters requires that something more than a lure be used because the lure is not heavy enough to sink the line to a desired depth.

Two classes of such conventional weights include one known as a downrigger and a second known as a so-called floating diver. The downrigger involves operating a second fishing line that detachably connects to a first line that includes a lure. The downrigger has a lead ball that is effective to carry the lure down in the water. A disconnect mechanism detaches the second line/lead ball when a fish pulls at the first line by taking the lure. The floating diver is configured to dive when pulled against a current either produced naturally or by trolling.

Each of the above two classes of conventional weights have drawbacks. The downrigger is complex and unwieldy, although effective as a sinker because of the relatively extreme weight of the lead ball which is more than heavy enough to sink in heavy current.

The floating diver is not as effective at sinking in heavy current as the lead ball of the downrigger. Additionally, the floating diver's response to current, i.e. diving, makes it difficult for a fisherman to reel in the line because the diver tends to resist being pulled toward the fisherman. The reason for that is that the same construction that causes it to dive when desired, also causes it to resist being reeled in with the line and lure.

In other words, the floating diver is constructed to respond to current by diving. Sometimes that response is desired and other times it is not. The problem for the fisherman is that there is no way to turn the diving response off when it is undesired.

Many conventional sinking fishing weights are also made from lead, a material that is presently undesirable due to human health risks associated with handling such material.

Until now, there has not been proposed a diving fishing weight that overcomes the above drawbacks of conventional materials, or meets the above desired properties.

Accordingly, it is a principal object of the present invention to provide a diving fishing weight which overcomes the drawbacks of prior-art proposals.

Another object is to provide such a fishing weight with dive-stop structure that is actuable by a force exerted along a fishing line to stop the fishing weight from diving.

Yet another object is to provide such a fishing weight that has an elongate body constructed to dive through water.

Another important object of the invention is to provide such a fishing weight that is formed of a lead-free composite material.

It is also an object of the invention to provide such a fishing weight that is predisposed to dive at a desired angle relative to the water surface.

Yet another object is to provide such a fishing weight that can be cost-effectively manufactured.

In brief summary, one aspect of the invention includes a diving fishing weight that is for receiving a length of fishing line with a first end connected to a fish catching device and a second end connected to a rod and reel assembly. The fishing weight includes a dive-inducing member constructed to dive through water, and dive-stop structure in communication with the dive-inducing member and the fishing line, and being actuable by a force exerted along the fishing line to stop the fishing weight from diving.

The dive-inducing member includes a body that has a front region oriented generally toward the fish catching device, a rear region oriented generally toward the rod and reel assembly, opposed sides and an upper surface. The dive-stop structure includes a passage defined by the body that extends through at least a portion of the body, with the passage having a first end proximate the front region of the body and a second end on the upper surface.

The fishing weight further includes a pair of wings connected to the body and extending in generally opposed directions outwardly and upwardly from the rear portion of the body toward the front portion and the upper surface to define a wing plane. The fishing weight has a center of gravity bounded generally by the wing plane, and the center of gravity and wing plane cooperate to predispose the weight to dive at a pre-determined angle.

Preferably, the fishing weight is also formed from a novel polymer-based composite material consisting essentially of a first volume of a curable polymeric component mixed with a second volume of iron ferrite particles, such that the unit has a specific gravity of about 7.5–8.0, with the unit including a central substantially uncured section and an outer substantially cured section.

These and other objects and advantages of the invention will be more clearly understood from a consideration of the accompanying drawings and the following description of the preferred embodiment.

BRIEF DESCRIPTION OF THE DRAWINGS

FIG. 1 is an isometric view of a diving fishing weight constructed in accordance with a preferred embodiment of the present invention. As shown the fishing weight receives a length of fishing line, which is connected to a fish catching device.

FIG. 2 is a bottom plan view thereof.

FIG. 3 is a rear elevational view thereof.

FIG. 4 is a left-side elevational view thereof.

FIG. 5 is a right-side elevational view thereof.

FIG. 6 is a top plan view thereof.

FIG. 7 is front elevational view thereof.

FIG. 8 is an enlarged cross-sectional view of the fishing weight of FIG. 1, taken generally along line 8—8 in FIG. 6.

FIG. 11 is a bottom plan view of an alternate embodiment of the fishing weight of FIG. 1.

FIG. 12 is an isometric view of a an alternate embodiment of the fishing weight of FIG. 1.

FIG. 13 is a top plan view of the fishing weight of FIG. 12.

FIG. 14 is an enlarged cross-sectional view of the fishing weight of FIG. 12, taken generally along line 14—14 in FIG. 13.

FIG. 15 is an enlarged cross-sectional view showing the fishing weight of FIG. 1 constructed from alternate materials of construction.

DETAILED DESCRIPTION OF THE PREFERRED EMBODIMENTS

Figure 10:
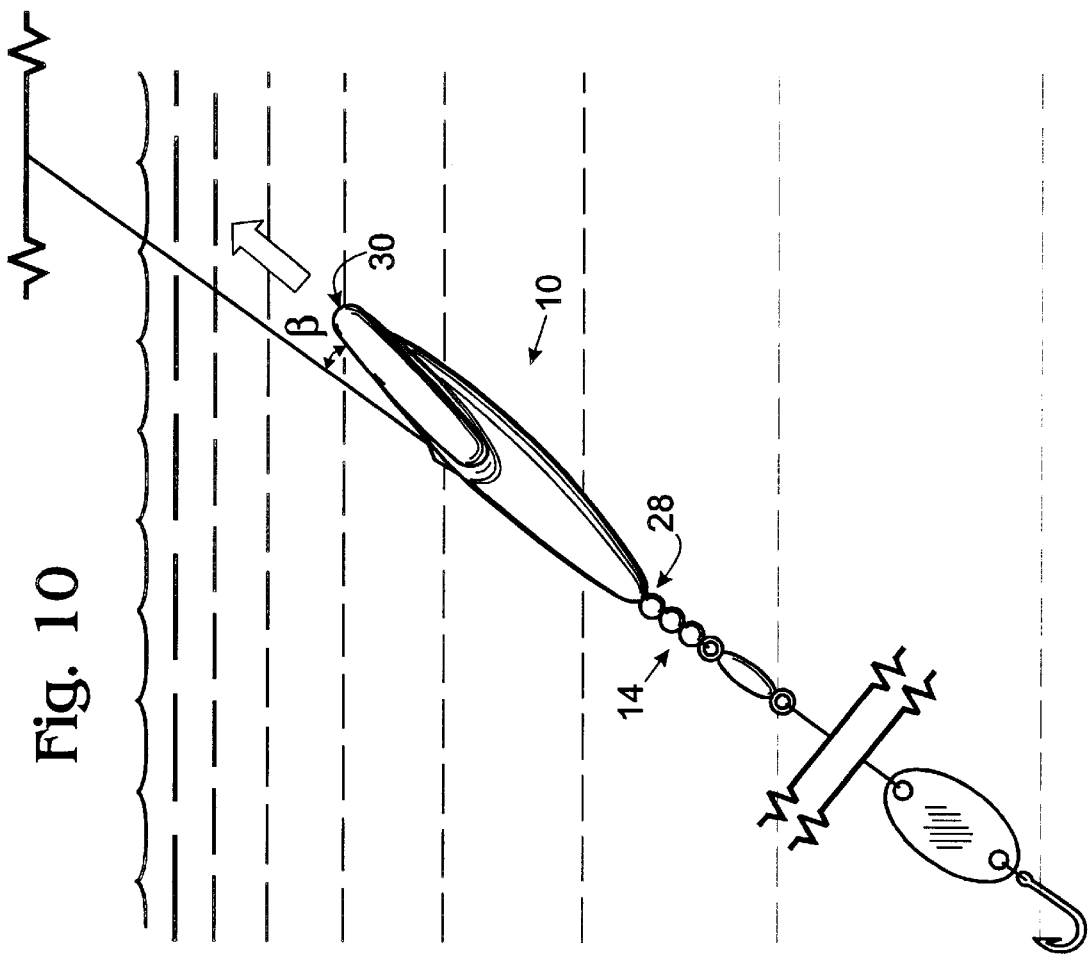
FIG. 10 is an environmental left-side view showing the fishing weight of FIG. 9, oriented at angle β with respect to the long axis of the tube to disengage the dive-inducing mechanism of the fishing weight.

A diving fishing weight constructed according to a preferred embodiment of the present invention is shown in FIG. 1 and generally indicated at 10. Fishing weight, or weight, 10 receives a length of fishing line 12 and has a first end connected to a fish catching device 14 and a second end connected to a rod and reel assembly (not shown). The fishing line, fish catching device and rod and reel assembly may vary in size and configuration and form no part of the claimed invention.

As shown in FIG. 1, fish catching device 14 includes a plurality of sinkers 16, a swivel 18, a lure 20 and a hook 22. It should be understood that the term "fish catching device" as used herein is meant to include all hooks, lures, swivels, weights, leaders, bait, other fishing paraphernalia and combinations thereof which are commonly attached to a fishing line to catch fish or other aquatic creatures.

As shown in FIGS. 1–4, the diving fishing weight includes a dive-inducing member 24, which is constructed to dive through water. Member 24 is predisposed to dive at a predetermined angle with respect to the surface of the body of water in which the weight is used. It is important to understand that the weight does not simply perform a sinking function, as do many conventional weights. Instead, the dive-inducing member is specifically configured to cause the weight to dive in the water at a given angle. This holds true whether the weight is cast into the water or if the weight is trolled into the wake created by a boat or water current.

Dive-inducing member 24 includes an elongate body 26, which has a front region 28 oriented generally toward fish catching device 14 and a rear region 30 oriented generally toward the rod and reel assembly. Body 26 also has a pair of opposed sides 32 and an upper surface 34. The body has a generally circular cross-section, taken along the long axis of the body, with the diameter of the cross-section diminishing toward the front and rear ends of the body to give the body an inwardly cylindrically tapered configuration.

The dive-inducing member further includes a pair of wings 36 that are connected to body 24 and extend in generally opposed directions both outwardly and upwardly from the rear portion of the body. Wings 36 extend toward the front portion and upper surface to define a wing plane 38. By "wing plane, it is meant the surface, or structure, whose boundary is generally defined by the subsequently described forward and rearward edges of wings 36. The wings are generally upwardly oriented as they extend forward along the body, as shown in FIGS. 4–5. As shown, the wings originate from the rear portion of the body, and a substantial portion of each wing extends above a horizontal plane extending through the long axis of the body, which is generally indicated at 39 in FIGS. 2 and 4. Wings 36, and therefore wing plane 38, terminate adjacent the midpoint between the front and rear end regions of the body.

Each wing includes a forward edge 40 that extends outwardly from a respective side of body 26 in a direction generally transverse to the body. Each wing 36 further includes an arcuate rearward edge 42 that is joined to forward edge 40 distal body 26, and extends at an angle in the range of approximately 30–40° relative to the forward edge. The rearward edges meet adjacent the rear portion of body 26. As shown, the forward and rearward edges are rounded and provide a smooth transition between the upper and lower surfaces of the wings. As seen in FIG. 2, the body and wings are configured to give the weight a generally squid-like appearance.

Figure 9:
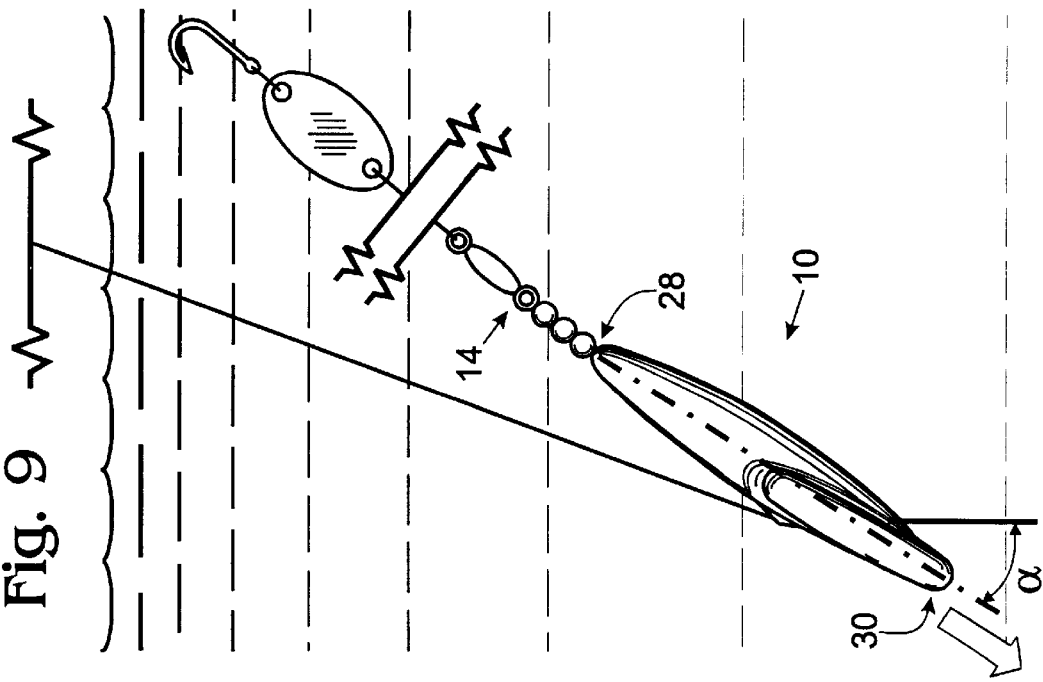
FIG. 9 is an environmental left-side view showing the fishing weight of FIG. 1 diving at angle α.

Weight 10 is configured to have a center of gravity this is bounded generally by wing plane 38. The location of the center of gravity and the wing plane cooperate generally to predispose the weight to dive at a predetermined angle. The configuration shown and described above produces a dive angle in the range of 50–85° with respect to the surface of the water. Preferably, the dive angle is in the range of 60–85°, and even more preferably, the dive angle is in the range of 70–80°. In FIG. 9, the weight is shown diving at an angle $\alpha$ with respect to a plane extending normal to the surface of the water, thereby producing a dive angle of 90° minus $\alpha$ with respect to the surface of the water. As the weight dives, it is oriented with its forward portion extending generally toward the surface of the water and its rear portion extending generally away from the surface of the water.

It should be understood that varying the shape of the wing plane and the location of the center of gravity of the weight will alter the dive angle. Additionally, it should be understood that the previously described dive angles may be affected by the currents and other external forces in the water surrounding the weight as it dives.

The weight further includes dive-stop structure 41 that is in communication with body 24 and fishing line 12 and at least temporarily renders the dive-inducing member ineffective. Accordingly, the dive-stop member may also be thought of as a dive-interrupting member. The dive-stop member is actuable by a force exerted along the fishing line, and prevents the weight from diving. It should be understood, however, that the dive-stop member prevents diving, but does not prevent sinking caused by gravity.

As shown in FIGS. 12–14, dive-stop structure 41 includes a passage 43 defined by body 26. The passage extends through at least a portion of the body and has a first end 44 proximate the front region of the body and a second, distal end 46, which is on the upper surface of body 26 and is generally oriented away from the wing plane. The front region of the body adjacent the first end is generally truncated as shown in FIGS. 11–12. The second end of the passage is preferably located on the upper surface generally between the center of gravity and the rear end of the body, thereby bounding the center of gravity between the first edge of the wings and the second end of the passage.

The passage extends downwardly at an angle of approximately 5–30° from the body's upper surface toward the body's front portion. Preferably, the passage extends downwardly at an angle of approximately 5–25°, and even more preferably at an angle of approximately 10–20°. When an external force is exerted along the fishing line, this force causes the weight to pivot from its current diving or other configuration and to be oriented so that the long axis of the passage is generally parallel to the fishing line, as shown in FIG. 10. In FIG. 10, the weight has pivoted from the orientation shown in FIG. 9, and is now oriented so that its rear portion extends generally toward the water's surface and its forward portion extends generally away from the water's surface. As shown, the wing plane extends away from the long axis of the passage by angle β, which preferably lies in the range discussed above. This configuration changes the orientation of the weight and thereby renders the dive-inducing member inactive. The force exerted on the line is imparted to the passage, where it is exerted along the long axis of the dive-stop member.

As shown in FIGS. 5–8, passage 43 further includes an elongate tube 50 that is disposed within the passage. As shown, the tube is substantially coextensive with the passage, and preferably extends at least partially outwardly from the second end of the passage. In this embodiment, the front region adjacent the first end of the tube is rounded or otherwise generally flush with the first end.

An alternate embodiment of weight 10 is shown in FIG. 11. In this embodiment, wings 36 extend adjacent the rear portion of body 26, and extend beyond the rear portion away from the front portion.

The weight may be formed of any suitable, relatively dense structural material. Preferably, the weight is formed from a curable material that enables the weight to be molded or otherwise formed as an integral unit.

With respect to the preferred composite material for making an integral unit version of fishing weight 10, certain chemical and physical features of that material will be described. In addition to the present disclosure, applicant also incorporates by reference the subject disclosed in his pending, U.S. patent application Ser. No. 08/489,122, filed Jun. 6, 1995 for an invention entitled Iron-Ferrite-Filled Polymer-Based Composite Material and Method of Making The Same.

The composite material is a curable, polymer-based composite material consisting essentially of a first volume of a curable polymeric component, and a second volume of iron ferrite particles. The polymeric component preferably includes a styrene butadiene resin (SBR). Example formulations will be described below. An example of a relative volume ratio is 100 parts polymeric component to 3,000 parts iron ferrite particles, and a method of forming the composite material will also be described. The relative volume ratio may vary depending on the application but, from the example, it should be clear that extremely high loading levels are possible using the to-be-described method of the invention.

Because of its high density, the composite material is usable as a lead substitute. The composite material is also moldable using conventional methods. The composite material is also magnetizable and millable after it is molded into a desired shape.

Referring to FIG. 15, fishing weight 10 is made of the composite material and may also be surface-coated with paint or other desired, suitable coating. Preferably, fishing weight 10 made from the composite material has a specific gravity in the range of about 7.5 to 8.0.

To form the polymer-based, and preferably rubber-based, composite material of the invention, the following method is performed. First, the method includes selecting a first amount of curable rubber-based resin, and selecting an amount of filler. Preferably, the rubber-based resin includes an SBR resin, and the filler is iron ferrite particles.

The method also includes the steps of reserving a fraction of the curable rubber-based resin from the first amount, and mixing the unreserved portion of the first amount of the curable rubber-based resin with the amount of filler. Next, the method includes adding the reserved second amount of the curable rubber-based resin to the mixture, and repeating the mixing step.

The reserving step may involve reserving plural fractions of the first amount of the curable rubber resin and, for such a case, the method will further include the step of performing the adding and repeating steps for each fraction.

Preferably, the reserving step includes cooling the reserved fraction of the first amount of the curable rubber resin. Generally speaking the cooling can be accomplished by reserving because the resin is warmed to a processing temperature in the mill. Where there are plural reserved fractions, then each reserved fraction is cooled.

EXAMPLE I

| Parts | Material |
| --- | --- |
| 110 | SBR 1712 |
| 20 | SBR 1009 |
| 5 | ZINC OXIDE |
| 2 | STERIC ACID POWDERED CURING AGENT |
| 1.5 | NAUGARD Q ANTI-OXIDANT |
| 3000 | IRON FERRITE POWDER |
| 20 | NEBONY 100 DESSICANT |
| 40 | CALIFLUX SP PLASTICIZER |
| 2.5 | SULFUR CURING AGENT |
| 1.5 | MBTS CURE ACCELERATOR |
| .35 | CUMATE CURE-CONTROLLNG AGENT |

The above example produces a product with a specific gravity of about 7.5–8.0, and could be used for applications such as the fishing weight or the first layer of a sound dampening system. The relative parts of each component are by volume. The processing temperature may vary as required by batch size. For production batches of about 900–950 pounds, the preferred processing temperature is between about 200–250° F. The above components are commercially available, and preferably the SBR resins are from Polysar, the zinc oxide from Azon, the Naugard Q anti-oxidant, Nebony 100 plasticizer and MBTS (2-mercaptobenzothiazyl disulfide) cure-controlling agent all from Harwick, the iron ferrite from Western Supply, and the Califlux SP plasticizer from H. M. Royal.

Numerous variations are possible with respect to blending of SBR resins, or choosing other suitable resins. With respect to Example I, the SBR 1712 resin is of the masterbatch type so that there is about 80 parts SBR and about 30 parts oil. The result is that Example I requires the usual 100 parts SBR.

With respect to the iron ferrite powder, any suitable particle size is acceptable, and 90 mesh (ASTM) has been found suitable.

Production batches of Example I can be made using a suitable mill or rotary mixer such as a Banbury mixer. The sequence of adding components may vary, but the cure-related components, particularly the sulfur and MBTS should be added last. Where practical, best results are obtained by pre-mixing the SBR 1712 and 1009 resins, reserving a fraction of about 30–50% of the pre-mixed resins, and then adding materials in the following sequence: (1) joint addition of zinc oxide, steric acid powder, and Naugard Q anti-oxidant, (2) joint addition of iron ferrite powder, Nebony 100 plasticizer, cumate cure-controlling agent, and Califlux SP plasticizer, (3) addition of the reserved fraction of pre-mixed SBR resins, and (4) joint addition of sulfur curing agent and MBTS cure accelerator.

By reserving the fraction of pre-mixed SBR resins, that fraction will drop in temperature substantially from the processing temperature, and temperature drops of about 50–100° F. are possible. Reintroducing that fraction after addition of the iron ferrite powder has been found to be effective in allowing the resins to be loaded with such a high percentage of iron ferrite powder as in Example I.

When made with a production mill, Example I requires about 45-minutes for adequate mixing. When made with a rotary mixer such as a Banbury mixer, Example I requires about 5-minutes for adequate mixing. When mixing is complete, the material will have a sheet-like appearance (mill mix) or a crumb-like appearance (Banbury mixer). When mixed using a Banbury mixer, the material is preferably dispensed from that mixer into a mill to produce a sheet-like form.

With respect to curing and molding of the composite material into desired shapes such as fishing weight 10, any suitable rubber curing/molding techniques can be used. The preferred cure temperature is about 325° F.

An important change to the conventional curing method is that the composite material is substantially undercured. For example, when a 2.5-inch diameter puck-like object is formed using the composite material, it should be cured for about 12 minutes at 325° F. That cure time will produce a desired central, substantially uncured section of the composite material, and a first outer, substantially cured section. The substantially cured section may also be thought of as a skin section. In general, the composite material is preferably undercured by curing it only for approximately 20–30% of the usual required time at the required temperature. Even though the composite material is undercured, it has been surprisingly effective for use in the applications described above.

EXAMPLE II

| Parts | Material |
| --- | --- |
| 110 | SBR 1712 |
| 20 | SBR 1009 |
| 5 | ZINC OXIDE |
| 2 | STERIC ACID POWDERED CURING AGENT |
| 1.5 | NAUGARD Q ANTI-OXIDANT |
| 130 | IRON FERRITE POWDER |
| 20 | NEBONY 100 DESSICANT |
| 40 | CALIFLUX SP PLASTICIZER |
| 2.5 | SULFUR CURING AGENT |
| 1.5 | MBTS CURE ACCELERATOR |
| .35 | CUMATE CURE-CONTROLLING AGENT |

The above example produces a product with a specific gravity of about 1.5–2.0, and could be used for applications such as the hockey puck-like sports article. The processing temperature is again preferably about 200–250° F. The materials are the same as those described in connection with Example I. The only change relative to the two examples is that substantially less iron ferrite powder is used. The reserving step can be used for Example II but, due to the substantial drop in relative percentage of iron ferrite powder, there is less need to use that step to achieve adequate dispersion of the iron ferrite powder in the resin.

The present invention therefore achieves the above objects by providing a polymer-based composite material which overcomes the drawbacks of prior-art proposals. The composite material has a suitably high density for use as a substitute for lead. It also has a suitable low-rebound characteristic for use as a sports article such as a hockey puck. The composite material also can be used as an effective sound dampener at relatively low thickness of less than about one inch. The composite material is also moldable and, in its resulting molded form, it is magnetizable and millable. The composite material is also capable of being cost-effectively manufactured.

Other application for the composite material include: (1) ballast devices, and particularly those used to counterbalance components in agriculture devices such as combine heads, and (2) tail weights in the curtain industry, particularly weights that are attached to curtains to stabilize them. Additionally, as mentioned above, this composite material also provides an ideal material for constructing the previously described diving fishing weights. A diving fishing weight constructed from this composite material is shown in FIG. 15, in which the previously described substantially uncured section is generally indicated at 52 and the previously described substantially cured section is generally indicated at 54.

Accordingly, while a preferred embodiment of the invention has been described herein, it is appreciated that modifications are possible that are within the scope of the invention.

It is claimed and desired to secure by Letters Patent:

1. A diving fishing weight for receiving a length of fishing line with a first end connected to a fish catching device and a second end connected to a rod and reel assembly, the weight comprising:

a dive-inducing member constructed to dive through water, the dive-inducing member including a body with opposed sides, an upper surface, a front portion oriented generally toward the fish catching device, and a rear portion oriented generally toward the rod and reel assembly; and dive-stop structure in communication with the dive-inducing member and the fishing line, and being actuable by a force exerted along the fishing line to stop the fishing weight from diving, wherein the dive-stop structure includes an elongate passage adapted to slidably receive a portion of the length of fishing line, and further wherein from a first end proximate the front portion of the body, the passage extends through at least a portion of the body toward the upper surface and terminates at a second end proximate the upper surface.

2. The fishing weight of claim 1, further including a pair of wings connected to the body and extending along at least a substantial portion of their length in generally opposed directions outwardly and upwardly from the rear portion of the body toward the front portion and the upper surface to define a wing plane.

3. The fishing weight of claim 2, wherein the fishing weight has a center of gravity bounded generally by the front portion and the wing plane.

4. The fishing weight of claim 3, wherein the center of gravity and wing plane cooperate to predispose the weight to dive at a pre-determined angle.

5. The fishing weight of claim 4 wherein the wing plane terminates adjacent the midpoint between the front and rear regions of the body.

6. The fishing weight of claim 5, wherein a substantial portion of each wing extends above a horizontal plane extending through the long axis of the body.

7. The fishing weight of claim 6, wherein the body, dive-stop structure and wings are formed as an integral unit.

8. The fishing weight of claim 2, wherein the wing plane terminates adjacent the second end of the passage.

9. The fishing weight of claim 2, wherein at least a substantial portion of the passage is disposed forward of the wings.

10. The fishing weight of claim 1, wherein the weight is formed of a curable, polymer-based composite material consisting essentially of a first volume of a curable polymeric component mixed with a second volume of iron ferrite particles, such that the weight has a specific gravity of about 7.5–8.0, with the weight including a central substantially uncured section and an outer substantially cured section.

11. The fishing weight of claim 10, wherein the polymeric component includes a styrene butadiene resin.

12. The fishing weight of claim 1, wherein the passage includes a tube extending along at least a substantial portion thereof.

13. The fishing weight of claim 12, wherein the tube extends from the body beyond the upper surface of the body.

14. The fishing weight of claim 1, wherein the dive-inducing member is predisposed to dive at an angle of approximately 70–80° relative to the water surface.

15. The fishing weight of claim 1, wherein the dive-stop structure extends downwardly at an angle of approximately 15–20° relative to the upper surface of the body.

16. A diving fishing weight for receiving a length of fishing line with a first end connected to a fish catching device and a second end connected to a rod and reel assembly, the fishing weight comprising:
   an elongate body having a distal end, an upper surface and a proximate end, and defining a passage extending from the proximate end to a region on the upper surface beyond the midpoint between the distal and the proximate ends, wherein the passage is adapted to slidably receive along its length the length of fishing line, and thereby enable the length of fishing line to extend through the body from the proximate end to the region on the upper surface; and
   a dive-inducing member that includes a pair of wings extending outwardly from opposed sides of the body to define a wing plane, the wings extending from the distal end of the body toward the upper surface of the body, and the wing plane oriented at an angle of approximately 10–25° relative to a horizontal plane extending through the long axis of the body.

17. The fishing weight of claim 16, wherein the body further includes an elongate tube disposed within the passage.

18. The fishing weight of claim 17, wherein the tube is substantially coextensive with the passage and at least partially extends outwardly from the upper surface.

19. The fishing weight of claim 18, wherein the passage extends generally upwardly from the long axis of the body at an angle of approximately 10–25° relative to a horizontal plane extending through the long axis of the body.

20. The fishing weight of claim 19, wherein the wing plane extends from adjacent the distal end of the body toward the upper surface at an angle of approximately 15–20° relative to a horizontal plane extending through the long axis of the body.

21. The fishing weight of claim 19, wherein each wing includes a rearward edge with an arcuate configuration and approaches the distal end of the body at an angle of approximately 30–40° relative to a plane normal to the distal end.

22. The fishing weight of claim 21, wherein the body and the wings are configured so that the weight has a center of gravity located within a range bounded by a forward edge of the wings and the distal end of the body.

23. The fishing weight of claim 22, wherein each wing terminates adjacent the midpoint between the distal and proximate ends of the body.

24. The fishing weight of claim 23, wherein the body includes an upper half with an upper surface and a lower half with a lower surface, and wherein the lower surface has a greater angle of curvature than the upper surface.

25. The fishing weight of claim 24, wherein a substantial portion of each wing is mounted to the upper surface of the body.

26. The fishing weight of claim 25, wherein the body, dive-inducing member and wings are formed as an integral unit.

27. The fishing weight of claim 26, wherein the weight is formed of a curable, polymer-based composite material consisting essentially of a first volume of a curable polymeric component mixed with a second volume of iron ferrite particles, such that the weight has a specific gravity of about 7.5–8.0, with the weight including a central substantially uncured section and an outer substantially cured section.

28. The fishing weight of claim 27, wherein the polymeric component includes a styrene butadiene resin.

29. A diving fishing weight for receiving a length of fishing line with a first end connected to a fish catching device and a second end connected to a rod and reel assembly, the weight comprising:
   a dive-inducing member constructed to dive through water, the dive-inducing member including a body with opposed sides, an upper surface, a front portion oriented generally toward the fish catching device, a rear portion oriented generally toward the rod and reel assembly, and a pair of wings connected to the body and extending along at least a substantial portion of their length in generally opposed directions outwardly and upwardly from the rear portion of the body toward the front portion and the upper surface to define a wing plane, wherein the wing plane terminates adjacent the midpoint between the front and rear regions of the body and a substantial portion of each wing extends above a horizontal plane extending through the long axis of the body; and
   dive-stop structure in communication with the dive-inducing member and the fishing line, and being actuable by a force exerted along the fishing line to stop the fishing weight from diving, wherein the dive-stop structure includes an elongate passage adapted to receive a portion of the length of fishing line, and further wherein from a first end proximate the front portion of the body, the passage extends through at least a portion of the body toward the upper surface and terminates at a second end proximate the upper surface,
   wherein the weight has a center of gravity bounded generally by the front portion and the wing plane, and the center of gravity and the wing plane cooperate to predispose the weight to dive at a pre-determined angle.

30. The weight of claim 29, wherein the body, dive-stop structure and wings are formed as an integral unit.

31. A diving fishing weight for receiving a length of fishing line with a first end connected to a fish catching device and a second end connected to a rod and reel assembly, the weight comprising:
   a dive-inducing member constructed to dive through water, the dive-inducing member including a body with opposed sides, an upper surface, a front portion oriented generally toward the fish catching device, and a rear portion oriented generally toward the rod and reel assembly; and dive-stop structure in communication with the dive-inducing member and the fishing line, and being actuable by a force exerted along the fishing line to stop the fishing weight from diving, wherein the dive-stop structure includes an elongate passage adapted to receive a portion of the length of fishing line, and further wherein from a first end proximate the front portion of the body, the passage extends through at least a portion of the body toward the upper surface and terminates at a second end proximate the upper surface, wherein the weight is formed of a curable, polymer-based composite material consisting essentially of a first volume of a curable polymeric component mixed with a second volume of iron ferrite particles, such that the weight has a specific gravity of about 7.5–8.0, with the weight including a central substantially uncured section and an outer substantially cured section.

32. The fishing weight of claim 31, wherein the polymeric component includes a styrene butadiene resin.

33. A diving fishing weight for receiving a length of fishing line with a first end connected to a fish catching device and a second end connected to a rod and reel assembly, the fishing weight comprising:

an elongate body having a distal end, an upper surface and a proximate end, and defining a passage extending from the proximate end to a region on the upper surface beyond the midpoint between the distal and the proximate ends, wherein the passage is adapted to receive along its length the length of fishing line, and thereby enable the length of fishing line to extend through the body from the proximate end to the region on the upper surface, wherein the passage extends generally upwardly from the long axis of the body at an angle of approximately 10–25° relative to a horizontal plane extending through the long axis of the body; and further wherein the body further includes an elongate tube disposed within the passage, said tube being substantially coextensive with the passage and at least partially extending outwardly from the upper surface of the body; and a dive-inducing member that includes a pair of wings extending outwardly from opposed sides of the body to define a wing plane, the wings extending from the distal end of the body toward the upper surface of the body, and the wing plane oriented at an angle of approximately 10–25° relative to a horizontal plane extending through the long axis of the body, wherein each wing includes a rearward edge with an arcuate configuration that approaches the distal end of the body at an angle of approximately 30–40° relative to a plane normal to the distal end, and each wing terminates adjacent the midpoint between the distal and proximate ends of the body, with the body and the wings configured so that the weight has a center of gravity located within a range bounded by a forward edge of the wings and the distal end of the body, wherein the body includes an upper half with an upper surface and a lower half with a lower surface, with the lower surface having a greater angle of curvature than the upper surface, and a substantial portion of each wing mounted to the upper surface, wherein the body, dive-inducing member and wings are formed as an integral unit, and further wherein the weight is formed of a curable, polymer-based composite material consisting essentially of a first volume of a curable polymeric component mixed with a second volume of iron ferrite particles, such that the weight has a specific gravity of about 7.5–8.0, with the weight including a central substantially uncured section and an outer substantially cured section.

34. The fishing weight of claim 33, wherein the polymeric component includes a styrene butadiene resin.

* * * * *